(12) United States Patent
Miyatake et al.

(10) Patent No.: US 7,976,669 B2
(45) Date of Patent: Jul. 12, 2011

(54) PRESSURE-SENSITIVE ADHESIVE AND RETARDATION LAYER-ATTACHED POLARIZING PLATE, METHOD FOR MANUFACTURING THEREOF, OPTICAL FILM, AND IMAGE DISPLAY

(75) Inventors: Minoru Miyatake, Ibaraki (JP); Hiroaki Mizushima, Ibaraki (JP); Yuusuke Toyama, Ibaraki (JP); Yuuji Saiki, Ibaraki (JP); Naoyuki Nitta, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 601 days.

(21) Appl. No.: 12/066,462

(22) PCT Filed: Sep. 28, 2006

(86) PCT No.: PCT/JP2006/319324
§ 371 (c)(1),
(2), (4) Date: Mar. 11, 2008

(87) PCT Pub. No.: WO2007/046223
PCT Pub. Date: Apr. 26, 2007

(65) Prior Publication Data
US 2010/0039590 A1    Feb. 18, 2010

(30) Foreign Application Priority Data
Oct. 21, 2005   (JP) .................. 2005-307376

(51) Int. Cl.
*B29C 65/00* (2006.01)
*B31B 1/60* (2006.01)
*B32B 37/00* (2006.01)
*B32B 7/12* (2006.01)
*G02F 1/1335* (2006.01)

(52) U.S. Cl. .............................. 156/327; 156/60; 349/96
(58) Field of Classification Search ................. 156/60, 156/327; 349/96; 359/494
See application file for complete search history.

(56) References Cited

U.S. PATENT DOCUMENTS

| | | | |
|---|---|---|---|
| 3,444,732 A * | 5/1969 | McKinley et al. .......... 73/150 A |
| 6,417,904 B1 | 7/2002 | Yamaoka et al. |
| 6,757,102 B2 | 6/2004 | Nishida et al. |
| 2002/0054262 A1 * | 5/2002 | Kitagawa et al. ............. 349/122 |
| 2003/0072078 A1 | 4/2003 | Higashio et al. |
| 2003/0151813 A1 | 8/2003 | Nishida et al. |

(Continued)

FOREIGN PATENT DOCUMENTS

JP    62-161103 A    7/1987

(Continued)

OTHER PUBLICATIONS

Machine Translation of JP 2004-054007.*

(Continued)

*Primary Examiner* — Philip C Tucker
*Assistant Examiner* — Michael N Orlando
(74) *Attorney, Agent, or Firm* — Westerman, Hattori, Daniels & Adrian, LLP

(57) ABSTRACT

A pressure-sensitive adhesive and retardation layer-attached polarizing plate (4) comprises a retardation layer-attached polarizing plate (3) comprising a polarizing plate (2) that comprises an iodine-based polarizer (1) and a transparent protective film laminated on both sides of the polarizer and a method for manufacturing the pressure-sensitive adhesive and retardation layer attached polarizing plate (4).

8 Claims, 1 Drawing Sheet

U.S. PATENT DOCUMENTS

| | | |
|---|---|---|
| 2005/0181148 A1 | 8/2005 | Kim et al. |
| 2006/0033993 A1 | 2/2006 | Sugino et al. |

FOREIGN PATENT DOCUMENTS

| | | |
|---|---|---|
| JP | 3009363 A | 1/1991 |
| JP | 3009021 A | 1/1995 |
| JP | 7-198945 A | 8/1995 |
| JP | 8-122524 A | 5/1996 |
| JP | 2001-83323 A | 3/2001 |
| JP | 2001-91744 A | 4/2001 |
| JP | 2001-100036 A | 4/2001 |
| JP | 2001-323238 A | 11/2001 |
| JP | 2002-214439 A | 7/2002 |
| JP | 2002-258052 A | 9/2002 |
| JP | 2002-258269 A | 9/2002 |
| JP | 2003-55477 A | 2/2003 |
| JP | 2003-185845 A | 7/2003 |
| JP | 2003-227934 A | 8/2003 |
| JP | 2004-54007 A | 2/2004 |
| JP | 2004-69975 A | 3/2004 |
| JP | 2004-133242 A | 4/2004 |
| JP | 2004-163606 A | 6/2004 |
| JP | 2004-341155 A | 12/2004 |
| JP | 2005-3884 A | 1/2005 |
| JP | 2005-10760 A | 1/2005 |
| JP | 2006-521418 T | 9/2006 |
| JP | 3960520 B2 | 5/2007 |
| WO | 2004/104655 A1 | 12/2004 |

OTHER PUBLICATIONS

Translation of International Preliminary Report on Patentability mailed May 2, 2008 of International Application No. PCT/JP2006/319324 (PCT/IB/338 , PCT/IB/326).

Japanese Office Action dated Jun. 25, 2010, issued in corresponding Japanese Patent Application No. 2005-307376.

Korean Office Action dated Jul. 22, 2008, issued in corresponding Korean Patent Application No. 10-2007-7007831.

International Search Report of PCT/JP2006/319324,date of mailing Oct. 31, 2006.

Japanese Office Action dated Sep. 28, 2010, issued in corresponding Japanese Patent Application No. 2005-307376.

* cited by examiner

[FIG.1]
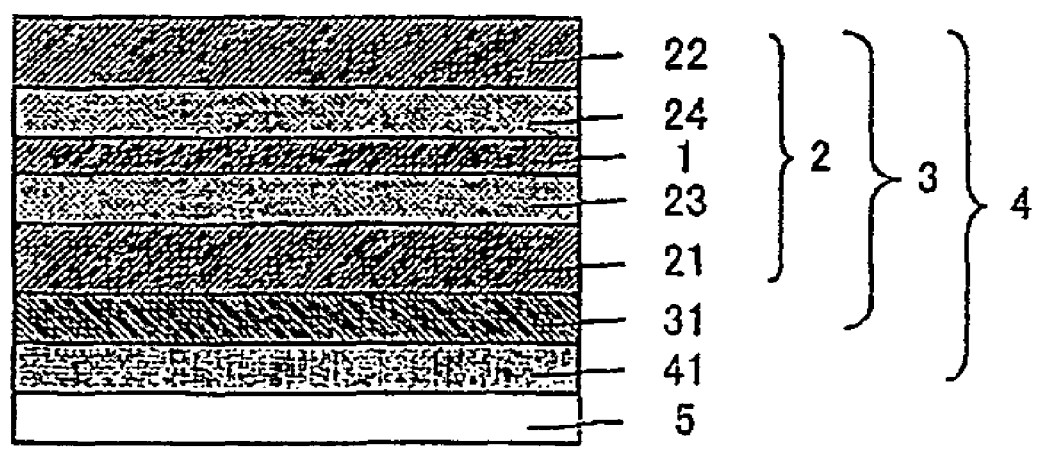

PRESSURE-SENSITIVE ADHESIVE AND RETARDATION LAYER-ATTACHED POLARIZING PLATE, METHOD FOR MANUFACTURING THEREOF, OPTICAL FILM, AND IMAGE DISPLAY

TECHNICAL FIELD

The invention relates to a pressure-sensitive adhesive and retardation layer-attached polarizing plate and a method for manufacture thereof. The pressure-sensitive adhesive and retardation layer-attached polarizing plate may be used alone or in the form of a laminate serving as an optical film to form an image display such as a flat panel display such as a liquid crystal display (hereinafter abbreviated as "LCD") and an electroluminescence display (hereinafter abbreviated as "ELD"), and a plasma display panel.

BACKGROUND ART

A conventional polarizing plate generally used for LCDs includes a polarizer and a transparent protective film bonded to both sides of the polarizer with an adhesive. A polyvinyl alcohol polarizer is generally used as the polarizer, which is produced by adsorbing iodine into polyvinyl alcohol and orienting it by stretching. Triacetylcellulose is generally used for the transparent protective film. In general, the polarizing plate is used in the form of a pressure-sensitive adhesive attached polarizing plate in which an acrylic pressure-sensitive adhesive layer made of an acrylic pressure-sensitive adhesive is laminated for stacking on a liquid crystal cell or the like.

In recent years, wide viewing angle and high contrast have been demanded. Therefore, a polarizing plate and a retardation layer (a birefringent layer) are laminated in such a manner that the retardation properties of the retardation layer can match the retardation properties of a liquid crystal cell during black viewing, so that high display quality has become possible by achieving wide viewing angle and high contrast. For example, a retardation layer using a discotic liquid crystal is laminated on a polarizing plate so that viewing angle can be significantly increased because of the oblique viewing angle compensation of a TN liquid crystal.

However, a retardation layer-attached polarizing plate having a laminated retardation layer using the discotic liquid crystal has a problem in which the polarizer can experience the effect of environmental change, such as dimensional shrinkage, so that the retardation of the retardation layer can be changed, the contrast can be reduced, or unevenness of in-plane black brightness can be developed, so that visibility can be significantly reduced.

Against such a problem, some techniques are proposed, which include reducing the thickness of a base film on which a discotic liquid crystal retardation layer is laminated (Patent Literature 1), using a material with a small photoelastic coefficient as the base film (Patent Literature 2), reducing the thermal expansion coefficient of a cellulose acetate film for use as the base film (Patent Literature 3), and increasing the stress relaxation properties of a pressure-sensitive adhesive layer (Patent Literature 4).

There is also proposed a method in which an adhesive containing an acetoacetyl group-containing polyvinyl alcohol resin and a crosslinking agent such as glyoxal is used between a polarizer and a transparent protective film in a polarizing plate so that the water resistance of the adhesive interface can be improved, and defects such as delamination (peeling of the edge portion of a transparent protective film from a polarizer) in severe high-temperature and humid environment can be avoided (Patent Literature 5).

Even if the techniques for improving durability are combined as described above to form the retardation layer-attached polarizing plate, however, in the above-mentioned environment, the peripheral portion of the polarizing plate can form peripheral unevenness due to depolarization and can have significantly reduced polarization performance to fail to maintain the visibility.

For on-vehicle applications and the like, it is also required that the visibility should be maintained even in a test simulating a very severe environment, such as a high temperature of 100° C., high temperature and high humidity of 60° C./95% RH, and a thermal shock test including cycles of the conditions of −40° C. and 80° C. However, pressure-sensitive adhesive layers with good stress relaxation properties generally have poor adhesion so that they cannot follow the sudden dimensional-shrinkage behavior of the polarizing plate in a thermal shock test and can suffer from appearance defects such as peeling and foaming.

Patent Literature 1: Japanese Patent Application Laid-Open (JP-A) No. 2004-163606
Patent Literature 2: JP-A No. 2001-100036
Patent Literature 3: JP-A No. 2003-55477
Patent Literature 4: JP-A No. 07-198945
Patent Literature 5: JP-A No. 2005-3884

DISCLOSURE OF THE INVENTION

Problems to be Solved by the Invention

It is an object of the invention to provide a pressure-sensitive adhesive and retardation layer-attached polarizing plate that is provided with a laminate of a retardation layer-attached polarizing plate and a pressure-sensitive adhesive layer and can resist a change in optical properties and keep visibility high, even under heated or humidified conditions.

It is another object of the invention to provide a pressure-sensitive adhesive and retardation layer-attached polarizing plate that can satisfactorily achieve high durability so as to resist appearance defects even in a thermal shock test.

It is a further object of the invention to provide a method for manufacturing the pressure-sensitive adhesive and retardation layer-attached polarizing plate, to provide an optical film using the pressure-sensitive adhesive and retardation layer-attached polarizing plate, and to provide an image display using the pressure-sensitive adhesive and retardation layer-attached polarizing plate or the optical film.

Means for Solving the Problems

As a result of active investigations for solving the problems, the inventors have found that the objects can be achieved with the pressure-sensitive adhesive and retardation layer-attached polarizing plate and so on as described below and have completed the invention.

The present invention relates to a pressure-sensitive adhesive and retardation layer-attached polarizing plate (4), comprising:
a retardation layer-attached polarizing plate (3) comprising: a polarizing plate (2) that comprises an iodine-based polarizer (1) and a transparent protective film laminated on both sides of the polarizer (1); and a retardation layer provided on at least one of the transparent protective films; and
an acrylic pressure-sensitive adhesive layer laminated on the retardation layer side of the retardation layer-attached polarizing plate (3), wherein the iodine-based polarizer (1) has a ratio (K/I), which is the content (% by weight) of potassium (K) to the content (% by weight) of iodine (I) in the polarizer, of 0.200 to 0.235, the polarizing plate (2) comprises the iodine-based polarizer (1) and the transparent protective film laminated with an adhesive layer formed from a water-soluble adhesive containing an acetoacetyl group-containing polyvinyl alcohol resin and a crosslinking agent, the retardation layer-attached polarizing plate (3) has a measured dimensional shrinkage of 0.5% or less in the direction of its absorption axis after it is allowed to stand at 80° C. for 24 hours, where the dimensional shrinkage is defined by the formula: dimensional shrinkage (%)=[{(dimension before standing)–(dimension after standing)}/(dimension before standing)]×100, and the pressure-sensitive adhesive and retardation layer-attached polarizing plate (4) has a single-piece transmittance of 41.0% to 43.2%.

In the pressure-sensitive adhesive and retardation layer-attached polarizing plate, the retardation layer of the retardation layer-attached polarizing plate (3) that formed by coating a liquid crystal material on the transparent protective film, or formed by separately forming a coating of a liquid crystal material and transferring the coating to the transparent protective film, and the transparent protective film is integrated with the retardation layer, can be used.

In the pressure-sensitive adhesive and retardation layer-attached polarizing plate, the retardation layer formed by fixing a tilt-oriented discotic liquid crystal layer is preferably In the pressure-sensitive adhesive and retardation layer-attached polarizing plate, it preferable that the acrylic pressure-sensitive adhesive layer of the pressure-sensitive adhesive and retardation layer-attached polarizing plate (4) is formed by a crosslinking reaction of an acrylic pressure-sensitive adhesive comprising a (meth)acrylic polymer (A) and a crosslinking agent.

In the pressure-sensitive adhesive and retardation layer-attached polarizing plate, it is preferable that the (meth)acrylic polymer (A) comprises 100 parts by weight of alkyl (meth)acrylate (a1) and 0.01 to 5 parts by weight of a hydroxyl group-containing (meth)acrylic monomer (a2) as copolymerizable components.

In the pressure-sensitive adhesive and retardation layer-attached polarizing plate, it is preferable that the acrylic pressure-sensitive adhesive comprises 100 parts by weight of the (meth)acrylic polymer (A) and 0.02 to 2 parts by weight of a peroxide (B) as a crosslinking agent.

In the pressure-sensitive adhesive and retardation layer-attached polarizing plate, it is preferable that the acrylic pressure-sensitive adhesive comprises 100 parts by weight of the (meth)acrylic polymer (A) and 0.001 to 2 parts by weight of an isocyanate compound (C) as a crosslinking agent.

In the pressure-sensitive adhesive and retardation layer-attached polarizing plate, it is preferable that the acrylic pressure-sensitive adhesive comprises 100 parts by weight of the (meth)acrylic polymer (A), 0.02 to 2 parts by weight of a peroxide (B) as a crosslinking agent, and 0.001 to 2 parts by weight of an isocyanate compound (C) as a crosslinking agent.

In the pressure-sensitive adhesive and retardation layer-attached polarizing plate, the acrylic pressure-sensitive adhesive preferably further comprises a silane coupling agent.

In the pressure-sensitive adhesive and retardation layer-attached polarizing plate, the acrylic pressure-sensitive adhesive layer may be laminated on the retardation layer with an anchor coat layer interposed therebetween.

The present invention also relates to a method for manufacturing the pressure-sensitive adhesive and retardation layer-attached polarizing plate (4), comprising:

a retardation layer-attached polarizing plate (3) comprising: a polarizing plate (2) that comprises an iodine-based polarizer (1) and a transparent protective film laminated on both sides of the polarizer (1); and a retardation layer provided on at least one of the transparent protective films, and an acrylic pressure-sensitive adhesive layer laminated on the retardation layer side of the retardation layer-attached polarizing plate (3), the method comprising:

subjecting the retardation layer-attached polarizing plate (3) to heat treatment under a tension of 60 N/m to 450 N/m at a heating temperature of 60° C. to 120° C.; and then laminating the acrylic pressure-sensitive adhesive layer on the retardation layer side of the heat-treated retardation layer-attached polarizing plate (3).

The present invention also relates to an optical film, comprising the pressure-sensitive adhesive and retardation layer-attached polarizing plate.

The present invention further relates to an image display, comprising the pressure-sensitive adhesive and retardation layer-attached polarizing plate or the optical film.

Effects of the Invention

As stated above, the pressure-sensitive adhesive and retardation layer-attached polarizing plate (4) of the invention includes a retardation layer-attached polarizing plate (3) and an acrylic pressure-sensitive adhesive layer laminated on the retardation layer side thereof, wherein the retardation layer-attached polarizing plate includes: a polarizing plate (2) that includes an iodine-based polarizer (1) and a transparent protective film laminated on both sides of the polarizer (1); and a retardation layer provided on at least one of the transparent protective films, and the elements (1) to (4) are specifically configured, respectively, so that the combination of such features can form a pressure-sensitive adhesive and retardation layer-attached polarizing plate that can resist a change in optical properties and keep visibility high even under heated or humidified conditions. For example, therefore, delamination, warpage, retardation change-induced compensation shift, polarization performance reduction, discoloration, unevenness in black brightness, and peripheral unevenness due to depolarization of peripheral portion can be prevented so that visibility can be maintained.

In the iodine-based polarizer (1), the ratio (K/I) of the potassium (K) content (% by weight) to the iodine (I) content (% by weight) in the polarizer is from 0.200 to 0.235. If the ratio (K/I) is within the above range, the polarizer can resist discoloration and show less changes in optical properties such as transmittance and polarization degree, even at high temperature, so that it can have good durability and high degree of polarization. If the ratio (K/I) is more than 0.235, the optical properties can undesirably be reduced during high-temperature heating. If the ratio (K/I) is less than 0.200, insufficient polarization properties can be provided, which are unfavorable for applications requiring high contrast. From these points of view, the ratio (K/I) is preferably from 0.205 to 0.230, more preferably from 0.210 to 0.225. The contents (% by weight) of iodine (I) and potassium (K) in the polarizer is determined from element contents obtained by X-ray fluorescence analysis as described in Examples.

In the polarizer (2), the iodine-based polarizer (1) and the transparent protective film are laminated with an adhesive layer formed from a water-soluble adhesive containing an acetoacetyl group-containing polyvinyl alcohol resin and a crosslinking agent. If such an adhesive is used to bond the iodine-based polarizer (1) to the transparent protective film, water resistance can be increased, and the configuration can be maintained even in severely hot and humid environment.

The retardation layer-attached polarizing plate (3) has a measured dimensional shrinkage of 0.5% or less in the direction of its absorption axis after it is allowed to stand at 80° C. for 24 hours, wherein the dimensional shrinkage is defined by the formula: dimensional shrinkage (%)=[{(dimension before standing)−(dimension after standing)}/(dimension before standing)]×100.

If the dimensional shrinkage is within the above range, dimensional contraction can be sufficiently suppressed so that depolarization of the peripheral portion can be effectively prevented. The dimensional shrinkage is preferably 0.45% or less, more preferably 0.40% or less. Specifically, the dimensional shrinkage is measured by the method described in Examples.

The pressure-sensitive adhesive and retardation layer-attached polarizing plate (4) has a single-piece transmittance of 41.0 to 43.2%. A single-piece transmittance of less than 41.0% can cause low brightness when white viewing is displayed and thus is unfavorable in terms of energy saving. A single-piece transmittance of more than 43.2% is unfavorable, because in a reliability test, such a transmittance can cause a significant change in optical properties so that red discoloration (reddish appearance of the surface of the polarizing plate) or unevenness can be easily detectable when the polarizing plates are perpendicularly arranged. From these points of view, the single-piece transmittance is preferably from 41.5 to 42.7%, more preferably from 41.8 to 42.4%. The single-piece transmittance of the pressure-sensitive adhesive and retardation layer-attached polarizing plate (4) is generally about 0.1 to about 0.3% lower than the single-piece transmittance of the iodine-based polarizer (1), due to the influence of the reflection from the surface of the pressure-sensitive adhesive layer or the retardation layer, and the like. The single-piece transmittance is a Y value with respect to C illuminant, which is calculated based on the spectral transmittance (CIE 1931) measured with a spectrophotometer as described in Examples.

In the pressure-sensitive adhesive and retardation layer-attached polarizing plate of the invention, the pressure-sensitive adhesive layer to be used is preferably an acrylic pressure-sensitive adhesive layer formed by a crosslinking reaction of an acrylic pressure-sensitive adhesive containing a (meth)acrylic polymer (A) and a crosslinking agent. When the acrylic pressure-sensitive adhesive uses a combination of a peroxide (B) and an isocyanate compound (C) as the crosslinking agent, high durability can be satisfactorily achieved such that appearance defects can be prevented even in a thermal shock test.

BRIEF DESCRIPTION OF THE DRAWING

FIG. 1 is a cross-sectional view showing an example of the pressure-sensitive adhesive and retardation layer-attached polarizing plate of the invention.

In the drawing, reference numeral 1 represents an iodine-based polarizer, 2 a polarizing plate, 21 and 22 transparent protective films, 23 and 24 polyvinyl alcohol adhesive layers, 3 a retardation layer-attached polarizing plate, 31 an acrylic pressure-sensitive adhesive layer, 4 a pressure-sensitive adhesive and retardation layer-attached polarizing plate, and 5 a separator.

DETAILED DESCRIPTION OF THE INVENTION

Methods for manufacturing the polarizing plate of the invention are described below with reference to the drawing. FIG. 1 shows an example of the pressure-sensitive adhesive and retardation layer-attached polarizing plate (4). FIG. 1 shows a polarizing plate (2) including an iodine-based polarizer (1) and transparent protective films (21) and (22) laminated on both sides of the polarizer (1). The transparent protective films (21) and (22) are bonded to the iodine-based polarizer (1) with adhesive layers (23) and (24), respectively. A retardation layer-attached polarizing plate (3) is shown that includes the polarizing plate (2) and a retardation layer (31) laminated on the transparent protective film (21) on its one side. In addition, an acrylic pressure-sensitive adhesive layer (41) is laminated on the retardation layer (31). In FIG. 1, a separator (5) is provided on the acrylic pressure-sensitive adhesive layer (41).

Although not shown in FIG. 1, the acrylic pressure-sensitive adhesive layer (41) may be laminated on the retardation layer (31) with an anchor coat layer interposed therebetween. While in FIG. 1, the retardation layer (31) is laminated directly on the transparent protective film (21), the retardation layer (31) may be laminated through a pressure-sensitive adhesive layer or adhesive layer, an adhesion-facilitating layer, an alignment film, or any combination thereof.

Also not shown in FIG. 1, any type of functional layer such as a hard coat layer, an antiglare layer and an anti-reflection layer may be laminated on the transparent protective film (22), and a surface protective film may also be laminated on the transparent protective film (22) or on the functional layer laminated thereon.

The iodine-based polarizer (1) may be of any type with a ratio (K/I) of 0.200 to 0.235. The content of iodine (I) in the iodine-based polarizer is generally from 1.5 to 4.0% by weight, preferably from 2.0 to 3.5% by weight. Its potassium (K) content is generally from 0.3 to 0.9% by weight, preferably from 0.4 to 0.8% by weight, more preferably from 0.45 to 0.75% by weight.

The iodine-based polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film comprises dichromatic materials such as iodine, dichromatic dye is suitably used.

A polyvinyl alcohol-based film can be formed by means of one of various methods such as a flow method in which a master liquid obtained by dissolving a polyvinyl alcohol-based resin into water or an organic solvent is caused to flow to form a film, a cast method and an extrusion method, and a film formed with a method can be properly employed. A polymerization degree of a polyvinyl alcohol-based resin is preferably in the range of from about 100 to about 5000 and more preferably in the range of from about 1400 to about 4000. It is generally used that having a saponification degree in the range of from about 80% by mole to about 100% by mole 5000.

A polarizer obtained by uniaxially stretching a polyvinyl alcohol-based film after being dyed with iodine or the like can be manufactured by means of the following method. The concentration of the solution used in a dyeing step or the like may be adjusted such that the resulting iodine-based polarizer can have a ratio (K/I) of 0.200 to 0.235.

In the dyeing step, a polyvinyl alcohol-based film is immersed in a dyeing bath to which iodine is added at a temperature of in the range of from about 20 to about 70° C. for a time in the range of from about 1 to about 20 minutes to thereby cause iodine to be adsorbed. An iodine concentration in the dyeing bath is usually in the range of from about 0.1 to about 1 part by weight relative to 100 parts by weight of water. A assistant may be added in the dyeing bath in the range of from about 0.01 to about 20 parts by weight and preferably in the range of 0.02 to 10 parts by weight; example of the assistant include: iodides such as potassium iodine, lithium iodide, sodium iodide, zinc iodide, aluminum iodide, lead iodide, copper iodide, barium iodide, calcium iodide, tin iodide and titanium iodide. The additives are especially preferable in order to enhance a dyeing efficiency. An organic solvent compatible with water can be contained in a small content.

A polyvinyl alcohol-based film may also be subjected to a swelling treatment in a water bath or the like at a temperature in the range of from about 20 to about 60° C. for a time in the range of about 0.1 to about 10 minutes before being dyed in iodine containing aqueous solution. Washing a polyvinyl alcohol-based film also exerts an effect of preventing non-uniformity such as unevenness in dyeing by swelling the polyvinyl alcohol-based film in addition to effects that contaminants and a blocking preventive agent on a surface of the polyvinyl alcohol-based film can be cleaned.

A polyvinyl alcohol-based film to which a dyeing treatment is applied can be crosslinked if necessary. A composition of a crosslinking aqueous solution conducting a crosslinking treatment is such that crosslinking agents such as boric acid, borax, glyoxal and glutaric aldehyde are usually either alone or in mixture added in the range of from about 1 to about 10 parts by weight relative to 100 parts by weight of water. A concentration of a cross linking agent is determined in consideration of a balance between optical characteristics and shrinkage of a polarizing plate caused by a stretching force generated in the polyvinyl alcohol-based film.

An assistant may be added into a crosslinking bath in the range of 0.05 to 15 parts by weight and preferably in the range of from 0.5 to 8 weight %; examples of the assistant includes: iodides such as potassium iodine, lithium iodide, sodium iodide, zinc iodide, aluminum iodide, lead iodide, copper iodide, barium iodide, calcium iodide, tin iodide and titanium iodide. The additives are especially preferable since uniform in-plane characteristics of a polarizer can be obtained. A temperature of an aqueous solution is usually in the range of from about 20 to about 70° C. and preferably in the range of from 40 to 60° C. No specific limitation is imposed on an immersion time, but an immersion time is usually in the range of from about 1 second to about 15 minutes and preferably in the range of from 5 seconds to 10 minutes. An organic solvent compatible with water may be contained in a small quantity in addition to a water solvent.

A total stretch ratio of a polyvinyl alcohol-based film is about 3 to about 7 times, preferably 5 to 6 times as large as the original length. If a total stretch ratio exceeds 7 times, the film is easier to be broken. Stretching may be conducted after being dyed with iodine, while being dyed or while being crosslinked, or followed by dyeing with iodine. A stretching method and the number of times of stretching are not specifically limited and stretching may be conducted only in one step. Alternatively, plural times of stretching may be conducted in the same step.

A polyvinyl alcohol-based film to which an iodine adsorption orientation treatment is applied can be further subjected to a step of immersing the film in an aqueous solution of an iodide such as potassium iodide with a concentration in the range of from 0.1 to 10 mass % at a temperature in the range of from about 10 to about 60° C. and preferably on the order in the range of from 30 to 40° C. for a time in the range of from 1 second to 1 minute. An assistant such as zinc sulfate or zinc chloride may be added into an iodide aqueous solution. A polyvinyl alcohol-based film to which an iodine adsorption orientation treatment is applied can be subjected to water washing step and a drying step at a temperature in the range of about 20 to about 80° C. for a time in the range of from about 1 minute to about 10 minutes.

For example, the step of drying the iodine-based polarizer (1) may be performed while a tension of 500 N/m or more is applied. When wet stretching at a stretch ratio of 5 to 7 is performed, a drying step under application of such a high tension can prevent the polarizer from having peripheral unevenness. The tension is preferably set at 550 N/m or more. While the tension has no particular upper limit and may be appropriately set at such a level that excessive stretching can be prevented, depending on the elastic modulus of the film and the like, it is generally 1200 N/m or less. The tension may be measured by the same method as applied on the retardation layer-attached polarizing plate (3) described later.

The thickness of the iodine-based polarizer is generally, but is not limited to, from about 5 to about 80 μm. If the polarizer is too thin, water can easily evaporate from the polarizer in a drying step or the like when the transparent protective film is attached thereto.

In the polarizing plate (2) of the invention, a transparent protective film is laminated on both sides of the iodine-based polarizer (1). Proper transparent materials may be used as a transparent polymer or a film material that forms the transparent protective file, and the material having outstanding transparency, mechanical strength, heat stability and outstanding moisture interception property, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The transparent protective film is formed as a cured layer made of heat curing type or ultraviolet ray curing type resins, such as acryl based, urethane based, acryl urethane based, epoxy based, and silicone based, or the like.

Moreover, as is described in Japanese Patent Laid-Open Publication No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

In view of polarizing properties and durability, the transparent protective film is preferably made of a cellulose type polymer such as triacetylcellulose. A triacetylcellulose film is particularly preferred. A triacetylcellulose protective film or the like can have a relatively large retardation Rth in the thickness direction and thus can cause the problem of discoloration. A resin composition containing an alternating isobutylene-N-methylmaleimide copolymer and an acrylonitrile-styrene copolymer may be used to form a film with a thickness-direction retardation Rth of 30 nm or less, which can be substantially free from discoloration.

The transparent protective film preferably includes a cyclic olefin resin as a main component. The cyclic olefin resin is a generic name and specifically described in JP-A Nos. 03-14882 and 03-122137. Examples include ring-opened polymers of cyclic olefins, addition polymers of cyclic olefins, random copolymers of cyclic olefins and α-olefins such as ethylene and propylene, and graft modifications thereof, which are modified with an unsaturated carboxylic acid, a derivative thereof or the like. Examples thereof also include hydrides thereof. Examples of the cyclic olefin include, but are not limited to, norbornene, tetracyclododecen, and derivatives thereof. Commercially available examples of the resin include ZEONEX and ZEONOR series manufactured by Nippon Zeon Co., Ltd., ARTON series manufactured by JSR Corporation, and Topas series manufactured by Ticona.

Moreover, it is preferable that the transparent protective film may have as little coloring as possible. Accordingly, a transparent protective film having a retardation value in a film thickness direction represented by $Rth=(nx-nz)\times d$ of from −90 nm to +75 nm (where, nx represents slow axis direction refractive index in a film plane, nz represents refractive index in a film thickness direction, and d represents a film thickness) may be preferably used. Thus, coloring (optical coloring) of polarizing plate resulting from the transparent protective film may mostly be cancelled using a transparent protective film having a retardation value (Rth) of from −90 nm to +75 nm in a thickness direction. The retardation value (Rth) in a thickness direction is preferably from −80 nm to +60 nm, and especially preferably from −70 nm to +45 nm.

Note that in a case where the transparent protective films are provided on both sides of a polarizer, the transparent protective films made from the same polymer may be used on both sides thereof or alternatively, the transparent protective films made from polymer materials different from each other may also be used on respective both sides thereof.

Thickness values of the transparent protective film can be properly determined and generally on the order in the range of from about 1 to about 500 μm from the viewpoint of a strength, workability such as handlability, requirement for a thin film and the like. Especially, the thickness values are preferably is in the range of from 1 to 300 μm and more preferably in the range of from 5 to 200 μm. The thickness of the transparent protective film is preferably 50 μm or less.

A hard coat layer, or antireflection processing, processing aiming at sticking prevention, diffusion or anti glare may be performed onto the face, where the retardation layer (3) is not laminated, that is, the surface of the transparent protective film (the transparent protective film 22 in FIG. 1), to which the iodine-based polarizer (1) is not bonded.

A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the transparent protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the transparent protective film itself, and also they may be prepared as an optical layer different from the transparent protective film.

The polarizing plate (2) includes the iodine-based polarizer (1) and transparent protective films that are laminated on both sides of the iodine-based polarizer (1) with adhesive layers formed from a water-soluble adhesive containing an acetoacetyl group-containing polyvinyl alcohol resin and a crosslinking agent.

The acetoacetyl group-containing polyvinyl alcohol resin is a polyvinyl alcohol adhesive having a highly-reactive functional group and preferred in terms of improving the durability of the polarizing plate.

An acetoacetyl group-containing polyvinyl alcohol resin is obtained by reacting a polyvinyl alcohol-based resin and diketene to each other with a known method. Examples of known methods include: a method in which a polyvinyl alcohol-based resin is dispersed into a solvent such as acetic acid, to which diketene is added and a method in which a polyvinyl alcohol-based resin is previously dissolved into a solvent such as dimethylformamide or dioxane, to which diketene is added. Another example is a method in which diketene gas or diketene liquid is brought into direct contact with a polyvinyl alcohol.

Examples of the polyvinyl alcohol-based resin include: a polyvinyl alcohol obtained by saponifying a polyvinyl acetate; a derivative thereof; a saponified copolymer of vinyl acetate and a monomer copolymerizable therewith; and polyvinyl alcohols modified by acetalization, urethanization, etherification, grafting, phosphate esterification and the like. Examples of the monomers include, unsaturated carboxylic acids such as maleic anhydride, fumaric acid, crotonic acid, itaconic acid and (meth) acrylic acid, and esters thereof; α-olefins such as ethylene and propylene; (meth)allylsulfonic acid or sodium salt thereof, (meth)allylsulfonate; sodium sulfonate (monoalkyl maleate), sodium disulfonate (alkyl maleate); N-methylolacrylamide; an alkai salt of acrylamide alkylsulfonate; N-vinylpyrrolidone, a derivative of N-vinylpyrrolidone and the like. The polyvinyl alcohol-based resins can be either used alone or in combination of two kinds or more.

While no specific limitation is imposed on a polyvinyl alcohol-based resin, an average degree of polymerization is from about 100 to about 3000, preferably from 500 to 3000 and a saponification degree is from about 85 to about 100 mol %, preferably from 90 to 100 mol % in consideration of adherence.

No specific limitation is imposed on a degree of modification by an acetoacetyl group in a acetoacetyl group-containing polyvinyl alcohol resin or groups as far as the degree of modification is 0.1 mol % or more. If the degree of modification is less than 0.1 mol %, water resistance of an adhesive layer is insufficient, which is improper. A degree of modification by an acetoacetyl group is preferably from about 0.1 to about 40 mol %, more preferably from 1 to 20 mol %. If a degree of modification by an acetoacetyl group exceeds 40 mol %, reaction sites with a crosslinking agent is fewer to thereby reduce an effect of improvement on moisture resistance and heat resistance. A degree of modification by an acetoacetyl group is a value measured by NMR.

Any of crosslinking agents that have been used in a polyvinyl alcohol-based adhesive can be used as a crosslinking agent in the invention without a specific limitation thereon. A crosslinking agent that can be used is a compound having at least two functional groups having reactivity with a polyvinyl alcohol-based resin. Examples thereof include: alkylene diamines having an alkylene group and two amino groups such as ethylene diamine, triethylene diamine and hexamethylene diamine; isocyanates such as tolylene diisocyanate, hydrogenated tolylene diisocyanate, trimethylolpropane tolylene diisocyanate adduct, triphenylmethane triisocyanate, methylenebis(4-phenylmethane) triisocyanate and isophorone diisocyanate, and ketoxime-blocked products thereof or isocyanates of phenol-blocked products; epoxy compounds such as ethylene glycol diglycidyl ether, polyethylene glycol diglycidyl ether, glycerin di- or triglycidyl ether, 1,6-hexanediol diglycidyl ether, trimethylolpropane triglycidyl ether, diglycidyl aniline and diglycidyl amine; monoaldehydes such as formaldehyde, acetaldehyde, propionaldehyde and butylaldehyde; dialdehydes such as glyoxal, malonaldehyde, succindialdehyde, glutardialdehyde, maleic dialdehyde and phthaldialdehyde; amino-formaldehyde resins such as condensates with formaldehyde of methylolurea, methylolmelamine, alkylated methylolurea, alkylated methylolmelamine, acetoguanamine and benzoguanamine; salts of divalent metals or trivalent metals such as sodium, potassium, magnesium, calcium, aluminum, iron and nickel, and oxides of the metals. Preferable among the crosslinking agents is a melamine crosslinking, especially methylolmelamine.

The amount of the crosslinking agent is generally from 0.1 to 30 parts by weight, preferably from 10 to 25 parts by weight, based on 100 parts by weight of the polyvinyl alcohol-based resin. In this range, polarizing plates with uniform polarizing properties and high durability can be obtained. On the other hand, in order to improve durability, a crosslinking agent can be mixed in the range of more than 30 parts by weight and not more than 46 parts by weight relative to 100 parts by weight of a polyvinyl alcohol-based resin. Especially, in a case where a polyvinyl alcohol-based resin containing an acetoacetyl group is used, a mixing content of a crosslinking agent is preferably more than 30 parts by weight. A water resistance can be drastically improved by mixing a crosslinking agent in the range of more than 30 parts by weight and not more than 46 parts by weight. The more a mixing content of a crosslinking agent is in the range, the better the agent works, wherein a mixing content thereof is preferably 31 parts by weight or more, more preferably 32 parts by weight or more and especially preferably 35 parts by weight or more. On the other hand, if a mixing content of a crosslinking agent is excessively more, a reaction of a crosslinking agent progresses in a short time to thereby tend to cause an adhesive to be gelated. As a result, a pot life as an adhesive is extremely shorter, which makes industrial use thereof difficult. A mixing content of a crosslinking agent is preferably 46 parts by weight or less, more preferably 45 parts by weight or less and most preferably 40 parts by weight or less from the view point described above.

In addition, various additives described below can be further mixed into the above aqueous adhesive: coupling agents such as a silane coupling agent and a titanium coupling agent; various kinds of tackifiers; an ultraviolet absorbent; an antioxidant; stabilizers such as a heat resistance stabilizer and a hydrolysis resistance stabilizer; and the like.

The polarizing plate (2) may be obtained by laminating the transparent protective films and the iodine-based polarizer (1) with the water-soluble adhesive. The adhesive may be applied to either one or both of the transparent protective film and the iodine-based polarizer. After the lamination, a drying step may be performed so that an adhesive layer including a dried coating layer can be formed. The iodine-based polarizer (1) and the transparent protective film may be laminated using a roll laminator or the like. The thickness of the adhesive layer is generally, but is not limited to, from about 30 to about 1000 nm, preferably from 100 to 500 nm.

When the polarizing plate (2) is prepared, the surface of the transparent protective film to be bonded to the iodine-based polarizer (1) may be provided with a resin layer or subjected to adhesion facilitating treatment. Examples of the adhesion facilitating treatment include dry treatment such as plasma treatment and corona treatment, chemical treatment such as alkali treatment, and coating treatment for forming an adhesion facilitating layer.

The retardation layer-attached polarizing plate (3) includes the polarizing plate (2) and a retardation layer formed on at least one of the transparent protective films of the polarizing plate (2).

As the retardation layer, birefringence films obtained by uniaxial or biaxial stretching polymer materials, oriented films of liquid crystal polymers, and materials in which orientated layers of liquid crystal polymers are supported with films may be mentioned. Although a thickness of a retardation layer also is not especially limited, it is in general approximately from 20 to 150 μm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation layer may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

A viewing angle compensation film is used as the retardation layer. A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film or the like may be used. As tilt orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film can be suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an tilt orientation layer of discotic liquid crystal polymer is supported with triacetyl cellulose film may preferably be used from a viewpoint of attaining a wide viewing angle with good visibility.

When a discotic liquid crystal compound is used, the state of tilt orientation of the liquid crystalline molecule may be controlled by means of its molecular structure and the type of an alignment film and by the use of an additive (such as a plasticizer, a binder and a surfactant), which may be appropriately added to the optically anisotropic layer.

It is preferred that the optical mean angle of the tilt orientation layer of the discotic liquid crystal polymer is tilt-oriented by a tilt angle of 5° to 50° with respect to the normal direction of the optical film.

If the tilt angle is controlled to be 5° or more, the layer can produce a significant viewing angle-widening effect when incorporated into liquid crystal displays or the like. On the other hand, if the tilt angle is controlled to be 50° or less, good viewing angles can be provided in all the vertical and lateral directions (four directions), and variations in viewing angle between good and bad angles depending on the direction can be prevented. From these viewpoints, the tilt angle is preferably from 10° to 30°.

The state of tilt orientation of the discotic liquid crystalline molecules may be a constant tilt orientation that does not vary with the distance between the optical material and the film plane or may vary with the distance between the optical material and the film plane.

An optical film having controlled three-dimensional refractive indices is preferably placed on the surface of the tilt orientation layer of the discotic liquid crystal polymer, in order that a wide viewing angle may be achieved and that the grayscale inversion range in the case of oblique viewing may be more effectively reduced.

The retardation layer is provided on the transparent protective film of the polarizing plate (2). For example, the retardation layer may be laminated on the transparent protective film with a pressure-sensitive adhesive layer or an adhesive layer interposed therebetween. Such a laminate is favorable when the retardation layer is a birefringent film produced by uniaxially or biaxially stretching a polymer material.

The retardation layer may be an oriented liquid crystal polymer film or layer. In such a case, an oriented liquid crystal polymer film or layer formed on a supporting substrate is generally used. Such a retardation layer may be formed by coating a liquid crystal material on the supporting substrate so that the supporting substrate can be integrated with the retardation layer. The supporting substrate may also serve as the transparent protective film of the polarizing plate (2). Alternatively, a coating of a liquid crystal material may be separately formed as a retardation layer, which may be transferred onto a transparent protective film, so that the retardation layer can be integrated with the transparent protective film. In such an arrangement, a pressure-sensitive adhesive layer or an adhesive layer may be interposed to form the laminate. When such a coating of the material for the retardation layer is formed, an adhesion facilitating layer, an alignment film or a combination of these layers may be formed on the supporting substrate.

When the retardation layer is formed on the supporting substrate in the invention, an oriented liquid crystal polymer layer is preferably formed on the supporting substrate such that the supporting substrate also serves as a transparent protective film. The supporting substrate is preferably a triacetylcellulose film, and the oriented liquid crystal polymer layer is preferably a tilt-oriented discotic liquid crystal layer.

The retardation layer-attached polarizing plate (3) has a measured dimensional shrinkage of 0.5% or less in the direction of its absorption axis after allowed standing at 80° C. for 24 hours.

In order to control the dimensional shrinkage of the retardation layer-attached polarizing plate (3) to within the above range, the retardation layer-attached polarizing plate (3) is preferably dried in a state where the tension applied thereto is kept as small as possible, after it is produced. The drying is preferably performed by heat treatment under the conditions of a tension of 450 N/m or less and a heating temperature of 60 to 120° C. In a preferred mode, the heat treatment is performed while the retardation layer-attached polarizing plate (3) after heating is taken and wound. If the tension exceeds 450 N/m, the dimensional shrinkage can be increased, and thus it is not favorable for the reduction of peripheral unevenness. In view of productivity, winding on a roll is preferably performed, while the heat treatment is performed. In view of the winding performance of the roll, the tension is preferably from 60 to 450 N/m. If the temperature is less than 60° C., the retardation layer-attached polarizing plate (3) can be insufficiently shrunk so that a significant dimensional change can occur after heat treatment. At higher than 120° C., optical properties such as hue can be degraded. The heat treatment is favorable when the iodine-based polarizer (1) is produced at a high total stretch ratio of 5 to 7 and particularly favorable when the drying step is performed under high tension.

In the heat treatment, the tension is preferably from 70 to 350 N/m, more preferably from 90 to 150 N/m. The magnitude of the tension may be controlled by the torque of the roll or the like, while there is no particular limitation to the method for applying the tension. When the retardation layer-attached polarizing plate (3) is conveyed by a roll and continuously heat-treated, the tension may be applied in the convey direction. For example, the tension may be measured with a load cell type tension pick-up roll, which allows the measurement of the tension based on the load on a convey roll.

The heat treatment temperature is preferably from 60 to 90° C., more preferably from 60 to 80° C. The heat treatment time is typically from 60 to 600 seconds, preferably from 120 to 480 seconds.

The pressure-sensitive adhesive and retardation layer-attached polarizing plate (4) of the invention includes the retardation layer-attached polarizing plate (3) and an acrylic pressure-sensitive adhesive layer laminated on the retardation layer side of the polarizing plate (3) and has a single-piece transmittance of 41.0 to 43.2%. If the iodine-based polarizer (1) satisfies the single-piece transmittance requirement as described above, the pressure-sensitive adhesive and retardation layer-attached polarizing plate (4) can also satisfy the same single-piece transmittance requirement.

The acrylic pressure-sensitive adhesive layer is preferably formed by the crosslinking reaction of an acrylic pressure-sensitive adhesive containing a (meth)acrylic polymer (A) and a crosslinking agent.

An alkyl group of an alkyl (meth)acrylate (a1) that is the main skeleton of a (meth)acrylic polymer (A) has about 1 to 18 carbon atoms and preferably about 1 to 9 carbon atoms, and concrete examples of alkyl (meth)acrylates include: methyl(meth)acrylate; ethyl(meth)acrylate; propyl(meth)acrylate; n-butyl(meth)acrylate; iso-butyl(meth)acrylate; 2-ethylhexyl(meth)acrylate; n-octyl(meth)acrylate; iso-octyl (meth)acrylate; lauryl(meth)acrylate; isononyl(meth)acrylate; stearyl(meth)acrylate; cyclohexyl(meth)acrylate; and the like. They can be used either alone or in combination. The alkyl groups thereof preferably have 3 to 9 carbon atoms on average. Note that (meth)acrylate means acrylate and/or methacrylate and the (meth) in the invention has the same in meaning.

While the (meth)acrylic polymer (A) may contain a monomer unit of only alkyl (meth)acrylate (a1), it may be a copolymer of alkyl (meth)acrylate (a1) and any other monomer. Examples of the copolymerized monomer include monomers having a functional group that can improve adhesive strength or serve as a crosslinking starting point, such as carboxyl group-containing monomers, sulfonic acid group-containing monomers, phosphoric acid group-containing monomers, acid anhydride group-containing monomers, hydroxyl group-containing monomers, amide group-containing monomers, amino group-containing monomers, imide group-containing monomers, and epoxy group-containing monomers. These functional group-containing monomers may be used alone or in combination of two or more thereof. In particular, for example, a hydroxyl group-containing (meth)acrylic monomer (a2) is preferred.

Concrete examples of a hydroxyl group-containing (meth)acrylic monomer (a2) include: 2-hydroxyethyl (meth)acrylate; 2-hydroxypropyl (meth)acrylate; 4-hydroxybutyl (meth)acrylate; 6-hydroxyhexyl (meth)acrylate; 8-hydroxyoctyl (meth)acrylate; 10-hydroxydecyl (meth)acrylate; 12-hydroxylauryl (meth)acrylate; (4-hydroxymethylcyclohexyl)-methyl acrylate; and the like. They can be used either alone or in combination.

A hydroxyl group-containing (meth)acrylic monomer (a2) preferably has the alkylen chain of a hydroxyalkyl of a hydroxyalkyl thereof having 4 or more carbon atoms because of high reactivity with an isocyanate compound (C). In a case where the alkylen chain of a hydroxyalkyl of a hydroxyalkyl group thereof having 4 or more carbon atoms is used as a hydroxyl group-containing (meth)acrylic monomer (a2), the alkyl group of an alkyl (meth)acrylate (a1) preferably has the number of carbon atoms equal to or less than the number of carbon atoms owned by the alkylen chain of a hydroxyalkyl of the hydroxyalkyl of a hydroxyl group-containing (meth)acrylic monomer (a2). For example, in a case where 4-hydroxybutyl (meth)acrylate is used as a hydroxyl group-containing (meth)acrylic monomer (a2), the alkyl group of an alkyl (meth)acrylate (a1) preferably has the number of carbons equal to or less than the alkyl group of butyl (meth)acrylate.

Examples of the carboxyl group-containing monomer include acrylic acid, methacrylic acid, carboxyethyl (meth)acrylate, carboxypentyl (meth)acrylate, itaconic acid, maleic acid, fumaric acid, and crotonic acid. In particular, acrylic acid and methacrylic acid are preferably used. Examples of the sulfonic acid group-containing monomer include styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid. Examples of the phosphoric acid group-containing monomer include 2-hydroxyethylacryloyl phosphate.

A copolymerization amount of a functional group-containing monomer is in the range of from 0.01 to 10 parts by weight relative to 100 parts by weight of an alkyl (meth)acrylate (a1). In a case, a functional group-containing monomer is a hydroxyl group-containing (meth)acrylic monomer (a2), the copolymerization amount is preferably in the range of from 0.01 to 5 parts by weight relative to 100 parts by weight of an alkyl (meth)acrylate (a1). If a copolymerization amount of a hydroxyl group-containing (meth)acrylic monomer (a2) is less than 0.01 parts by weight, cross-linking points with an isocyanate cross-linking agent are smaller in density, which is unprofitable in regard to adherence to an optical film and durability. On the other hand, if the copolymerization amount exceeds 5 parts by weight, cross-linking points are excessively large in density, which is unprofitable in regard to stress relaxability. A copolymerization amount of a hydroxyl group-containing (meth)acrylic monomer (a2) is preferably in the range of from 0.01 to 4 parts by weight and more preferably in the range of from 0.03 to 3 parts by weight.

Concerning the (meth)acrylic polymer (A) of the invention, the monomers copolymerizable with the alkyl (meth) acrylate (a1) include not only the functional group-containing monomer but also a component for increasing cohesive force or heat resistance, such as a cyano group-containing monomer, a vinyl ester monomer and an aromatic vinyl monomer. The other copolymerizable component may be used in combination with the functional group-containing monomer or separately from the functional group-containing monomer.

Preferable examples of other copolymerizable components include: compounds each without a functional group such as benzyl (meth)acrylate; methoxyethyl (meth)acrylate; ethoxymethyl (meth)acrylate; phenoxyethyl (meth)acrylate; (meth)acrylamide; vinyl acetate; and (meth)acrylonitrile, on which no limitation is placed. A copolymerization amount of each of the described above is preferably 100 parts by weight or less and more preferably 50 parts by weight or less relative to 100 parts by weight of an alkyl (meth)acrylate (a1).

Average molecular weight of the acrylic polymer is not limited, but the weight average molecular weight of 500,000 to 3,000,000 is preferable, 1,000,000 to 2,500,000 is more preferable, 1,200,000 to 2,000,000 is further preferable. The (meth)acrylic polymer may be produced by a variety of known methods, for example, by a method appropriately selected from radical polymerization methods including a bulk polymerization method, a solution polymerization method and a suspension polymerization method. A variety of known radical polymerization initiators may be used such as azo initiators and peroxide initiators. The reaction is generally performed at a temperature of about 50° C. to about 80° C. for a time period of 1 to 8 hours. Among the above methods, the solution polymerization method is particularly preferred, and ethyl acetate, toluene, or the like is generally used as an acrylic polymer solvent. The concentration of the solution is generally from about 20 to about 80% by weight.

In a case where a peroxide is used as a polymerization initiator, a residual peroxide remaining unused in a polymerization reaction can also be used in a cross-linking reaction. In that case, a residual amount of the peroxide is measured and if a proportion of a peroxide is less than a predetermined amount, the peroxide can be added so as to be a predetermined amount for use.

Any crosslinking agent reactive with the (meth)acrylic polymer (A) is preferably used. Examples of the crosslinking agent include peroxides, isocyanate crosslinking agents, epoxy crosslinking agents, metal chelate crosslinking agents, melamine crosslinking agents, aziridine crosslinking agents, and metal salts. Alternatively, ultraviolet rays or electron beams may be used for crosslinking. While these crosslinking agents may be used alone or in combination of two or more thereof, a peroxide or an isocyanate crosslinking agent is preferred. In particular, a peroxide is preferably used in combination with an isocyanate crosslinking agent. Crosslinking with a peroxide is preferred in view of stability over time after crosslinking. An isocyanate crosslinking agent is preferred in view of adhesion to optical components. The crosslinking agent is generally used in an amount of about 0.001 to about 10 parts by weight, preferably of 0.001 to 5 parts by weight, based on 100 parts by weight of the (meth)acrylic polymer (A).

A peroxide (B) can be any peroxide without placing specific limitation thereon as far as it can generate a radical by heating to thereby enable cross-linking to be formed in a (meth)acrylic polymer (A). If a productivity is considered, a one minute half-life temperature is preferably in the range of about 70 to 170° C. and more preferably in the range of about 90 to 150° C. If a one minute half-life temperature is excessively low, a cross-linking reaction occurs in storage prior to coating a pressure sensitive adhesive to thereby raise a viscosity of a coating material to impossibility of coating in some case. On the other hand, if a one minute half-life temperature is excessively high, a temperature in a cross-linking reaction is raised to thereby unpreferably cause other side effects, to disable a target characteristic to be achieved due to insufficiency of decomposition, or to cause a cross-linking reaction to progress over time thereafter in the presence of the residual peroxide.

Note that a half-life of a peroxide is an index expressing a decomposition speed of the peroxide and a time in which a decomposed quantity of the peroxide is a half of the total amount, and data of a decomposition temperature to achieve a half-life of an arbitrary time and a half-life at an arbitrary temperature is given in maker's catalogues, an example of which is a catalogue of organic peroxides, ninth edition, edited by NOF Corporation. (May, 2003).

In the invention, any peroxide capable of producing active radical species by heating or photoirradiation and promoting the crosslinking of the base polymer in a pressure-sensitive adhesive composition may be appropriately used. In view of workability and stability, a peroxide with a one-minute half-life temperature of 80° C. to 160° C. is preferably used, and a peroxide with a one-minute half-life temperature of 90° C. to 140° C. is more preferably used. If the one-minute half-life temperature is too low, the reaction can proceed during storage before coating and drying so that coating can be made impossible due to an increase in viscosity. On the other hand, if the one-minute half-life temperature is too high, the crosslinking reaction temperature can be high so that a side reaction can occur, or a large part of the peroxide can remain unreacted so that crosslinking can undesirably proceed over time in some cases.

Examples of such a peroxide (B) include di(2-ethylhexyl) peroxydicarbonate (one-minute half-life temperature: 90.6° C.), di(4-tert-butylcyclohexyl) peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethylhexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di(tert-hexylperoxy)cyclohexane (one-minute half-life temperature: 149.2° C.). In particular, di(4-tert-butylcyclohexyl) peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used, because of high crosslinking reaction efficiency.

An amount of a peroxide (B) is in the range of from 0.02 to 2 parts by weight, preferably in the range of from 0.05 to 1 parts by weight and more preferably in the range of from 0.06 to 0.5 parts by weight, relative to 100 parts by weight of a (meth)acrylic polymer (A). If an amount of a peroxide (B) is less than 0.02 parts by weight, it is unpreferable in regard to durability since a cross-linking reaction is insufficient. On the other hand, if an amount of a peroxide (B) exceeds 2 parts by weight, it is unpreferable since cross-linking occurs in excess, thereby degrading adherence.

Although not proved, the details of the reason why the use of the peroxide crosslinking can produce the above-described properties may be as follows. In the crosslinking with the peroxide, first, a radical (active species) produced from the peroxide can cause a hydrogen abstraction reaction from a polymer skeleton so that radicals can be produced on the polymer skeleton. The radicals on the polymer skeleton can be coupled to form a crosslink, and the whole of the polymer skeleton can be incorporated into the crosslinked structure so that the whole of the pressure-sensitive adhesive can be uniformly crosslinked. As a result, performance such as prevention of adhesion of the pressure-sensitive adhesive to cutting blades and prevention of glue protruding after processing can be achieved even when a working process such as stamping or punching is performed immediately after the crosslinking process, and the specific crosslinking process can prevent an additional crosslinking reaction over time so that the characteristics can be stabilized.

Note that a decomposition amount of the peroxide remained after a reaction treatment can be measured with, for example, HPLC (high performance liquid chromatography).

More specifically, for example, after the reaction process, about 0.2 g of each pressure-sensitive adhesive composition is taken out and immersed in 10 ml of ethyl acetate and shaken and subjected to extraction at 25° C. and 120 rpm for 3 hours in a shaker and then allowed to stand at room temperature for 3 days. Thereafter, 10 ml of acetonitrile is added, and the mixture is shaken at 25° C. and 120 rpm for 30 minutes. About 10 µl of the liquid extract obtained by filtration with a membrane filter (0.45 µm) is subjected to HPLC by injection and analyzed so that the amount of the peroxide after the reaction process can be determined.

An isocyanate compound (C), which is used for crosslinking agent, contains an isocyanate compound. Examples of the isocyanate compounds include: isocyanate monomers such as tolylene diisocyanate; chlorophenylene diisocyanate, hexamethylene diisocyanate, tetramethylene diisocyanate, isophorone diisocyanate; xylylene diisocyanate, diphenylmethane diisocyanate, hydrogenated diphenylmethane diisocyanate, and adduct type isocyanate compounds obtained by adding the isocyanate monomer to a polyhydroxy alcohol, for example trimethylolpropane; and urehthane prepolymer type isocyanates obtained by addition reaction of an isocyanurate compound, a burette type compound, in addition thereto a known polyether polyol, a known polyester polyol, a acryl polyol, a polybutadiene polyol, a polyisoprene polyol and the like. Among the isocyanate compound (C), preferable is an adduct type isocyanate compound such as xylylene diisocyanate in terms of improvement on adherence to an optical film.

An amount of an isocyanate compound (C) is in the range of from 0.001 to 2 parts by weight, preferably in the range of from 0.01 to 1.5 parts by weight and more preferably in the range of from 0.02 to 1 part by weight relative to 100 parts by weight of a (meth)acrylic polymer (A). If an amount of an isocyanate compound (C) is less than 0.001 parts by weight, it is unpreferable in regard to adherence to the retardation layer of the retardation layer-attached polarizing plate (3) and durability. On the other hand, if an amount of an isocyanate compound (C) exceeds 2 parts by weight, adherence is improved according to an amount in excess, whereas the range is still preferable in consideration of a total balance in controlling a degree of cross-linking with handling ability mainly affected by cross-linking of a peroxide (B).

Although the details of the reason why the use of the isocyanate crosslinking agent can produce the above-described characteristics are unclear, the crosslink of the (meth) acrylic polymer with specific amounts of the isocyanate crosslinking agent and the peroxide can form a structure in which both of a crosslink formed by the peroxide (peroxide crosslink) and a crosslink formed by the isocyanate crosslinking agent (isocyanate crosslink) exist on the (meth)acrylic polymer. Thus, it is believed that the crosslink of the main chain (peroxide crosslink) with good relaxation characteristics formed by the peroxide and the strong urethane bond (isocyanate crosslink) formed by the isocyanate crosslinking agent may coexist in a well-balanced manner so that sufficient cohesive strength and a behavior capable of relaxing the stress on the pressure-sensitive adhesive can be exhibited, and as a result, defects can be prevented after thermal shock testing.

If necessary, the acryl-based pressure-sensitive adhesive of the present invention may conveniently contain various types of additives such as tackifiers, plasticizers, fillers such as glass fibers, glass beads, metal power, or any other inorganic powder, pigments, colorants, antioxidants, ultraviolet absorbers, and silane-coupling agents, without departing from the object of the invention. The pressure-sensitive adhesive layer may also contain fine particles so as to have light diffusion properties.

Of the additives, preferable is a silane coupling agent. Examples of silane coupling agents include: silicon compounds having an epoxy structure such as 3-glycidoxypropyltrimethoxysilane, 3-glycidoxypropylmethyldimethoxysilane and 2-(3,4-epoxycyclohexyl) ethyltrimethoxysilane; amino group containing silicon compounds such as 3-aminopropyltrimethoxysilane, N-(2-aminoethyl)3-aminopropyltrimethoxysilane and N-(2-aminoethyl)3-aminopropylmethyldimethoxysilane; 3-chroropropyltrimethoxysilane; an acetoacetyl group containing trimethoxysilane; (meth)acrylic group containing silane coupling agents such as 3-chroropropyltrimethoxysilane; an acetoacetyl group containing trimethoxysilane; 3-acryloxypropyltrimethoxysilane, and 3-methacryloxypropyltrimethoxysilane; and isocyanate group containing silane coupling agents such as 3-isocyanatepropyltriethoxysilane. Especially preferably used are 3-glycidoxypropyltrimethoxysilane and a trimethoxysilane containing an acetoacetyl group since peeling is effectively suppressed. A silane coupling agent can impart an effect of durability and an effect of suppressing peeling off especially in humidified environment. An amount of a silane coupling agent is 1 part by weight or less, preferably in the range of from 0.01 to 1 part by weight and more preferably in the range of from 0.02 to 0.6 parts by weight relative to 100 parts by weight of a (meth)acrylic polymer (A). If an amount of a silane coupling agent is larger, an adhering strength to a liquid crystal cell is excessively large, which creates a case where an influence is given on reworkability.

In the present invention, a gel percent in the cross-linked acrylic pressure sensitive adhesive layer is preferably adjusted in the range of 40 to 95% by weight, more preferably adjusted in the range of from 45 to 90% by weight and further more preferably adjusted in the range of from 50 to 85% by weight by controlling an amount of addition of a cross-linking agent (a peroxide and an isocyanate crosslinking agent). If a gel percent is less than 35% by weight, durability may decrease because of lower cohesion, while if a gel percent exceeds 95% by weight, an adhesion tends to be degraded.

The gel fraction of the pressure-sensitive adhesive composition according to the invention is a value determined by a process including immersing a dry weight $W_1$ (g) of the pressure-sensitive adhesive layer in ethyl acetate, then taking the insoluble part of the pressure-sensitive adhesive layer out of the ethyl acetate, measuring the weight $W_2$ (g) thereof after drying, and calculating the value of $(W_2/W_1) \times 100$ as a gel fraction (% by weight).

More specifically, for example, $W_1$ (g) (about 500 mg) of the pressure-sensitive adhesive layer after the crosslinking was sampled and then immersed in ethyl acetate at about 23° C. for 7 days. The pressure-sensitive adhesive layer was then taken out and dried at 130° C. for 2 hours, and the weight $W_2$ (g) of the resulting pressure-sensitive adhesive layer was measured. $W_1$ and $W_2$ were used in the above formula to give a gel fraction (% by weight).

In order to adjust the gel fraction to a specific value, the amount of addition of the peroxide or the isocyanate crosslinking agent should be controlled, and the influence of the crosslinking temperature or the crosslinking time should also be fully taken into account.

A cross-linking treatment temperature and a cross-linking treatment time are preferably adjusted and set, for example, so that a decomposition quantity of a peroxide contained in an acrylic pressure sensitive adhesive is 50% by weight or more, more preferably 60% by weight or more and further more preferably 70% by weight or more. If a decomposition quantity of peroxide is less than 50% by weight, it is not preferable that a residual amount of the peroxide in the pressure sensitive adhesive composition is larger and a cross-linking reaction occurs over time even after a heat treatment.

To be more concrete, for example, at a one minute half-life temperature as a heat treatment temperature, a decomposition quantity of a peroxide is 50% by weight in 1 minute and 75% by weight in 2 minutes; therefore, a heat treatment time for 1 minute or more is required. If a half-life (a time required for reduction to a half quantity) of a peroxide at a heat treatment temperature is 30 seconds, a heat treatment time for 30 seconds or more is necessary and if a half-life (a time required for reduction to a half quantity) of a peroxide at a cross-linking treatment temperature is 5 minutes, a cross-linking treatment time for 5 minutes or more is necessary.

In such a way, a cross-linking treatment temperature and a cross-linking treatment time for a peroxide to be used can be theoretically calculated from a half-life (a time required for reduction to a half quantity) on the assumption that the peroxide is decomposed in linear proportion, thereby enabling an amount of addition to be properly adjusted. On the other hand, since as a higher temperature is adopted, a possibility of a side reaction is raised, a cross-linking temperature is preferably 170° C. or less.

The crosslinking may be performed at the temperature of the process of drying the pressure-sensitive adhesive layer, or the crosslinking process may be separately performed after the drying step.

While the crosslinking time may be determined taking productivity or workability into account, it is generally from about 0.2 to about 20 minutes, preferably from about 0.5 to about 10 minutes.

No specific limitation is imposed on a material made of an anchor coat layer inserted between a pressure sensitive adhesive layer of the pressure-sensitive adhesive and retardation layer-attached polarizing plate of the invention and the retardation layer, while preferable is a material, showing good adherence to both the pressure sensitive adhesive layer and the retardation layer, and forming a film excellent in cohesive force. Examples of materials showing such properties include: various kinds of polymers, a sol of a metal oxide, silica sol and the like. Among them, especially preferably used are polymers.

Examples of the polymers include: a polyurethane-based resin, a polyester-based resin and polymers each include an amino group in a molecule. States in use of the polymers may be any of a solvent-soluble type, a water-dispersion type and a water-soluble type. Examples thereof include: a water-soluble polyurethane; a water-soluble polyester; and a water-soluble polyamide; and water-dispersion type resins (an ethylene-vinyl acetate-based emulsion, a (meth)acrylic-based emulsion and the like). Besides, water-dispersion types include: emulsions of various kinds of resins such as polyurethane, polyester, polyamide and the like obtained by using an emulsifying agent, emulsions of the resins obtained from self-emulsifiable resins obtained by introducing an anion group, a cation group or a nonion group each of a water-dispersible hydrophillic group into the resins and the like. Besides, an ionic polymer complex can be used.

Such polymers are preferably polymers each containing a functional group having a reactivity with an isocyanate compound (C) in a pressure sensitive adhesive. The polymers are preferably polymers each containing an amino group in a molecule. Especially preferably used is a polymer having a primary amino group at the terminal ends.

Examples of polymers containing an amino group in a molecule include: polyethyleneimine; polyallylamine; polyvinylamine; polyvinylpyridine; polyvinylpyrrolidine; a polymer of an amino group containing monomer such as dimethylaminoethyl acrylate. Among them, preferable is a polyethyleneimine.

No specific limitation is imposed on a polyethyleneimine and various kinds of polyethyleneimines can be used. No specific limitation is placed on a weight average molecular weight of a polyethyleneimine, whereas a weight average molecular weight thereof is usually in the range of about 100 to 1,000,000. Examples thereof as commercial products are named Epomin SP series (SP-003, SP-006, SP-012, SP-018, SP-103, SP-110, SP-200, and the like) and Epomin P-1000 and the like manufactured by Nippon Shokubai Co., Ltd. Among them, preferable is Epomin P-1000.

Any of polyethyleneimines may be used as far as it has a polyethylene structure and examples thereof include: an ethyleneimine adduct to a polyacrylic acid ester and/or a polyethyleneimine adduct. A polyacrylic acid ester is obtained by emulsion polymerization according to an ordinary method from an alkyl (meth)acrylate of which a base polymer of an acrylic-based pressure sensitive adhesive (a (meth)acrylic polymer) exemplified above is constituted and a copolymerizable monomer therewith. A copolymerizable monomer that is used is a monomer having a functional group such as a carboxyl group to react the copolymerizable monomer with ethyleneimine. A proportion of use of a monomer having a functional group such as carboxyl group is adjusted properly depending on a proportion of ethyleneimine as a reactant. A copolymerizable monomer to be used is preferably a styrene monomer, as described above. A copolymerizable monomer can also be an grafted adduct of polyethyleneimine by reacting a separately synthesized polyethyleneimine with a carboxyl group or the like in an acrylic acid ester. For example, especially preferable as commercial products are Polyment NK-380 and 350 manufactured by Nippon Shokubai Co., Ltd.

An ethyleneimine adduct and/or a polyethyleneimine adduct of an acrylic polymer emulsion can be used. An example of a commercial product is Polyment SK-1000 manufactured by Nippon Shokubai Co., Ltd.

No specific limitation is placed on a polyallylamine and examples thereof include: diallylamine hydrochloric acid salt-sulfur dioxide copolymer, diallylmethylamine hydrochloric acid copolymer, polyallylamine hydrochloric acid salt, allyamine-based compounds such as polyallylamine, condensates of polyalkylene polyamine and dicarboxylic acid such as diethylene triamine and an epihalohydrin adduct of the condensate, polyvinylamine and the like. Polyallylamine is preferable since it is soluble in water/alcohol. No specific limitation is imposed on a weight average molecular weight of a polyallylamine, whereas a weight average molecular weight thereof is preferably in the range of about 10,000 to 100,000.

In formation of an anchor coat layer, a strength of the anchor coat layer can be raised by mixing a polymer containing an amino group and a compound reacting with a polymer containing an amino group together to thereby cause crosslinking. An epoxy compound or the like can be exemplified as a compound reacting with a polymer containing an amino group.

In the pressure-sensitive adhesive and retardation layer-attached polarizing plate (4) of the invention, the pressure-sensitive adhesive layer is formed by crosslinking the acrylic pressure-sensitive adhesive composed as described above. In the process, the pressure-sensitive adhesive is generally crosslinked after the pressure-sensitive adhesive is applied, but alternatively, a crosslinked pressure-sensitive adhesive layer may be transferred onto the retardation layer of the retardation layer-attached polarizing plate (3) or the like.

Any method may be used to form the pressure-sensitive adhesive layer on the retardation layer. For example, the pressure-sensitive adhesive layer may be formed by a method that includes applying the pressure-sensitive adhesive to a release-treated separator or the like, removing a polymerization solvent and the like by drying and transferring the pressure-sensitive adhesive layer onto the retardation layer or by a method that includes applying the pressure-sensitive adhesive composition to the retardation layer and removing a polymerization solvent and the like by drying to form a pressure-sensitive adhesive layer on the retardation layer. When the pressure-sensitive adhesive is applied onto the retardation layer, one or more solvents other than the polymerization solvent may be further added to the pressure-sensitive adhesive such that it can be uniformly applied onto the retardation layer.

Examples of such solvents include methyl ethyl ketone, acetone, ethyl acetate, tetrahydrofuran, dioxane, cyclohexanone, n-hexane, toluene, xylene, methanol, ethanol, n-propanol, isopropanol, and water. These solvents may be used alone or in combination of two or more thereof.

Known methods for the production of pressure-sensitive adhesive sheets may be used to form the pressure-sensitive adhesive layer for use in the invention. Examples of such methods include roll coating, kiss roll coating, gravure coating, reverse coating, roll brush, spray coating, dip roll coating, bar coating, knife coating, air knife coating, curtain coating, lip coating, and extrusion coating with a die coater.

The pressure-sensitive adhesive layer may have a thickness of 2 to 500 µm, preferably of about 5 to about 100 µm. The surface of the pressure-sensitive adhesive layer may undergo adhesion facilitating treatment such as corona treatment, plasma treatment, and the formation of an adhesion-facilitating layer or may be provided with an antistatic layer.

When the pressure-sensitive adhesive is exposed on such a surface, the pressure-sensitive adhesive layer may be protected with a release sheet (a separator or a release film) having undergone release treatment, before practical use.

Examples of the material for forming the separator include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film. The thickness of the separator is generally from 5 to 200 µm, preferably from about 5 to about 100 µm.

If necessary, the separator may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, and fluorine treatment, the releasability from the pressure-sensitive adhesive layer can be further increased.

In the above production method, the release-treated sheet may be used, as it is, as a separator for the pressure-sensitive adhesive and retardation layer-attached polarizing plate (4), so that the process can be simplified.

In practical use, the pressure-sensitive adhesive and retardation layer-attached polarizing plate of the invention may be used to form an optical film including a laminate of the polarizing plate and any other optical layer. While there is no particular limitation to the optical layer, for example, one or more optical layers usable for the formation of liquid crystal displays or the like, such as reflecting plates and semi-transparent plates may be used.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the transparent protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the pressure-sensitive adhesive and retardation layer-attached polarizing plate may be formed by a method in which laminating is separately carried out sequentially in manufacturing process of a liquid crystal display etc., an optical film in a form of the optical layer being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described pressure-sensitive adhesive and retardation layer-attached polarizing plate and other optical films, the optical axis may be set as a suitable configuration angle according to the target retardation characteristics etc.

In addition, in the present invention, ultraviolet absorbing property may be given to the above-mentioned each layer of the invention, such as pressure-sensitive adhesive and retardation layer-attached polarizing plate, and the optical film etc., using a method of adding UV absorbents, such as salicylic acid ester type compounds, benzophenol type compounds, benzotriazol type compounds, cyano acrylate type compounds, and nickel complex salt type compounds.

The pressure-sensitive adhesive and retardation layer-attached polarizing plate and the optical film of the invention are preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive and retardation layer-attached polarizing plate or the optical film and optionally other components such as a lighting system and incorporating a driving circuit according to any conventional technique, except that the pressure-sensitive adhesive and retardation layer-attached polarizing plate or the optical film of the invention is used. Any type of liquid crystal cell may also be used such as a TN type, an STN type and a $\pi$ type.

Suitable liquid crystal displays, such as liquid crystal display with which the above-mentioned the pressure-sensitive adhesive and retardation layer-attached polarizing plate or the optical film has been located at one side or both sides of the liquid crystal cell, and with which a backlight or a reflective plate is used for a lighting system may be manufactured. In this case, the pressure-sensitive adhesive and retardation layer-attached polarizing plate or the optical film of the present invention may be installed in one side or both sides of the liquid crystal cell. When installing the pressure-sensitive adhesive and retardation layer-attached polarizing plate or the optical film in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to π/4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

The features and advantages of the invention are specifically described below with examples and so on. In each example, "part" or "parts" and "%" are by weight, unless otherwise stated.

The polarizer, the retardation layer-attached polarizing plate, or the pressure-sensitive adhesive and retardation layer-attached polarizing plate obtained in each of Examples and Comparative Examples was measured for physical properties by the methods below. The results are shown in Table 1.

[Element Content Ratio]

The content (% by weight) of iodine (I) in the polarizer and the content (% by weight) of potassium (K) in the polarizer were measured by performing X-ray fluorescence analysis. The element content ratio (K/I) was calculated from the measurement result.

Measuring system: X-ray fluorescence analyzer ZSX110e manufactured by Rigaku Corporation
X-ray source: Rh
Power: 40 kV, 90 mA
Measurement diameter: 10 mmφ
Atmosphere: vacuum Measurement method: Quantitative analysis was performed using a standard thin film sample and fixed values of polarizer thickness and B content.

[Dimensional Shrinkage]

A square test piece (10 cm×10 cm) with one side parallel to the direction of the absorption axis was cut from the retardation layer-attached polarizing plate. Incisions parallel to the direction of the absorption axis of the polarizer were made with a cutter in the central portion of the edge of the test piece, and the space between the incisions (dimension before standing) was measured with a micrometer caliper. The test piece was then allowed to stand at 80° C. for 24 hours, and then the space between the incisions (dimension after standing) was measured again. From these results, the dimensional shrinkage (%) was calculated according to the formula below.
Dimensional shrinkage (%)=[{(dimension before standing)−(dimension after standing)}/(dimension before standing)]×100

[Single-Piece Transmittance]

The polarizer and the pressure-sensitive adhesive and retardation layer-attached polarizing plate were measured for single-piece transmittance in a spectrophotometer (U-4100 manufactured by Hitachi, Ltd.) equipped with an integrating sphere. When the transmittance was measured with respect to each linearly polarized light, completely polarized light obtained through a Glan-Thomson Prism polarizer was defined as being 100%. The transmittance was expressed in a Y value that was calculated based on the CIE 1931 color system and corrected for luminosity. The single-piece transmittance T was calculated according to the formula: $T=(k_1+k_2)/2$, wherein $k_1$ represents a transmittance for linearly polarized light in a maximum transmittance direction, and $k_2$ represents a transmittance for linearly polarized light in a direction perpendicular thereto.

Example 1

Polarizer

A 75 μm-thick polyvinyl alcohol film with an average polymerization degree of 2400 and a saponification degree of 99.9% by mole was immersed in warm water at 30° C. for 60 seconds and allowed to swell. The film was then immersed in an aqueous iodine solution with an iodine/potassium iodide (1/7 in weight ratio) concentration of 0.4% and dyed while it was stretched such that the stretch ratio reached 3.5 times. The film was then stretched in an aqueous boric acid ester solution at 65° C. such that the total stretch ratio reached 6 times. The film was further immersed in an aqueous solution of 3% potassium iodide at 30° C. for 5 seconds. After stretching, the film was dried in an oven at 40° C. for 3 minutes to give a polarizer. The polarizer had a single-piece transmittance of 42.4%.

(Transparent Protective Film)

An 80 μm-thick triacetylcellulose film was used.

(Retardation Layer-Attached Transparent Protective Film)

Wide View Film SA manufactured by Fuji Photo Film Co., Ltd. was used. The Wide View Film SA includes a triacetylcellulose base film and an oriented liquid crystal layer that is made of an ultraviolet-cured discotic liquid crystal compound and fixed on the base film with a crosslinked polyvinyl alcohol-based alignment film interposed therebetween.

(Polyvinyl Alcohol Adhesive)

At a temperature of 30° C., 100 parts of an acetoacetyl group-containing polyvinyl alcohol resin (with an average polymerization degree of 1200, a saponification degree of 98.5% by mole and an acetoacetylation degree of 5% by mole) and 32 parts of methylolmelamine were dissolved in pure water, and the solid content of the mixture was adjusted to 4%, so that an aqueous adhesive solution was prepared.
(Preparation of Retardation Layer-Attached Polarizing Plate)

The adhesive was applied to one side of the transparent protective film (triacetylcellulose film) such that the adhesive layer would have a thickness of 80 nm after drying of the adhesive. On the other hand, the adhesive was applied onto the oriented liquid crystal layer-free side of the triacetylcellulose base film such that the adhesive layer would have a thickness of 80 nm after drying of the adhesive. Each adhesive was applied at a temperature of 30° C., 30 minutes after its preparation. At a temperature of 30° C., the transparent protective film and the retardation layer-attached transparent protective film were then bonded to both sides of the polarizer with a roller. The resulting laminate was then dried at 70° C. for 5 minutes under a tension of 100 N/m to give a retardation layer-attached polarizing plate. The dimensional shrinkage of the retardation layer-attached polarizing plate was 0.39%.
(Preparation of Pressure Sensitive Adhesive)

Into a reaction vessel with a cooling tube, a nitrogen introducing tube, a thermometer and an agitator, 99 parts of butyl acrylate, 1.0 part of 4-hydroxybutyl acrylate and 0.3 part of 2,2-azobisisobutylonitrile were added together with ethyl acetate, the mixture was subjected to a reaction at 60° C. in a nitrogen gas stream for 4 hours, thereafter ethyl acetate was added into the reaction liquid to obtain a solution (with a solid matter concentration of 30%) containing an acrylic polymer with a weight average molecular weight of 1,650,000. Mixed into the acrylic polymer solution were 0.15 part of dibenzoyl peroxide (manufactured by NOF Corporation. with a trade name of Nyper BO-Y), 0.02 part of trimethylolpropanexylenediioscyanate (manufactured by Mitsui Takeda Chemicals Inc. with a trade name Takenate D110N) and 0.2 part of a silane coupling agent (manufactured by Soken Chemical & Engineering Co., Ltd. with a trade name of A-100, which is acetoacetyl group containing silane coupling agent) relative to 100 parts of a solid matter of the acrylic polymer solution to thereby obtain an acrylic pressure sensitive adhesive.
(Preparation of Pressure-Sensitive Adhesive and Retardation Layer-Attached Polarizing Plate)

The pressure-sensitive adhesive was applied to a separator, which was made of a polyester film whose surface was treated with a silicone release agent, and heat-treated at 155° C. for 3 minutes to form a 20 μm-thick pressure-sensitive adhesive layer. The separator having the pressure-sensitive adhesive layer was transferred and attached to the oriented liquid crystal layer of the retardation layer-attached polarizing plate so that a pressure-sensitive adhesive and retardation layer-attached polarizing plate was prepared. The gel fraction of the pressure-sensitive adhesive layer was 60% by weight.

Example 2

Polarizer

A polarizer was obtained using the process of Example 1, except that the concentration of the aqueous iodine solution was changed to 0.37% so that the single-piece transmittance of the resulting polarizer was changed to 43.2%.

A retardation layer-attached polarizing plate and then a pressure-sensitive adhesive and retardation layer-attached polarizing plate were prepared using the process of Example 1, except that the polarizer prepared as described above was used instead. The retardation layer-attached polarizing plate had a dimensional shrinkage of 0.40%.

Example 3

Preparation of Pressure-Sensitive Adhesive

To a four-neck flask equipped with a nitrogen introducing tube and a cooling tube were added 95 parts of butyl acrylate, 5 parts of acrylic acid, 0.1 parts of 2-hydroxyethyl acrylate, 0.05 parts of 2,2-azobisisobutyronitrile, and 200 parts of ethyl acetate. After sufficient replacement with nitrogen, the mixture was subjected to polymerization reaction at 55° C. for 20 hours with stirring under a stream of nitrogen gas so that an acrylic polymer with a weight average molecular weight of 1,570,000 was obtained. An acrylic pressure-sensitive adhesive was obtained by uniformly mixing a solution of the acrylic polymer relative to 100 parts of a solid matter, 0.08 parts of 3-glycidoxypropyltrimethoxysilane, and 0.8 parts of a polyisocyanate crosslinking agent composed of a tolylene diisocyanate adduct of trimethylolpropane.
(Preparation of Pressure-Sensitive Adhesive and Retardation Layer-Attached Polarizing Plate)

The pressure-sensitive adhesive was applied to a separator, which was made of a polyester film whose surface was treated with a silicone release agent, and heat-treated at 130° C. for 3 minutes to form a 25 μm-thick pressure-sensitive adhesive layer. The separator having the pressure-sensitive adhesive layer was transferred and attached to the oriented liquid crystal layer of the retardation layer-attached polarizing plate of Example 1 so that a pressure-sensitive adhesive and retardation layer-attached polarizing plate was prepared. The gel fraction of the pressure-sensitive adhesive layer was 6% by weight.

Comparative Example 1

Polarizer

A polarizer was obtained using the process of Example 1, except that the concentration of the aqueous iodine solution was changed to 0.35% so that the single-piece transmittance of the resulting polarizer was changed to 44.3%.

A retardation layer-attached polarizing plate and then a pressure-sensitive adhesive and retardation layer-attached polarizing plate were prepared using the process of Example 1, except that the polarizer prepared as described above was used instead. The retardation layer-attached polarizing plate had a dimensional shrinkage of 0.40%.

Comparative Example 2

Polyvinyl Alcohol Adhesive

A hundred parts of a polyvinyl alcohol resin (with an average polymerization degree of 1800 and a saponification degree of 98.5% by mole) and 25 parts of methylolmelamine were dissolved in pure water at a temperature of 30° C., and the solid content of the mixture was adjusted to 4%, so that an aqueous adhesive solution was prepared.

A retardation layer-attached polarizing plate and then a pressure-sensitive adhesive and retardation layer-attached polarizing plate were prepared using the process of Example 1, except that the adhesive prepared as described above was used instead. The retardation layer-attached polarizing plate had a dimensional shrinkage of 0.39%.

Comparative Example 3

Preparation of Pressure-Sensitive Adhesive and Retardation Layer-Attached Polarizing Plate A retardation layer-attached polarizing plate was obtained using the process of Example 1, except that after the transparent protective film and the retardation layer-attached transparent protective film were bonded to both sides of the polarizer with a roller, the resulting laminate was dried at 70° C. for 5 minutes under a tension of 500 N/m. The dimensional shrinkage of the retardation layer-attached polarizing plate was 0.60%.

A pressure-sensitive adhesive and retardation layer-attached polarizing plate was prepared using the process of Example 1, except that the retardation layer-attached polarizing plate obtained as described above was used instead.

Comparative Example 4

Polarizer

A 75 μm-thick polyvinyl alcohol film with an average polymerization degree of 2400 and a saponification degree of 99.9% by mole was immersed in warm water at 30° C. for 60 seconds and allowed to swell. The film was then immersed in an aqueous iodine solution with an iodine/potassium iodide (1/7 in weight ratio) concentration of 0.4% and dyed while it was stretched such that the stretch ratio reached 3.5 times. The film was then stretched in an aqueous boric acid ester solution at 65° C. such that the total stretch ratio reached 6 times. The film was further immersed in an aqueous solution of 5% potassium iodide at 30° C. for 5 seconds. After stretching, the film was dried in an oven at 40° C. for 3 minutes to give a polarizer. The polarizer had a single-piece transmittance of 42.2%.

A retardation layer-attached polarizing plate and then a pressure-sensitive adhesive and retardation layer-attached polarizing plate were prepared using the process of Example 1, except that the polarizer prepared as described above was used instead. The retardation layer-attached polarizing plate had a dimensional shrinkage of 0.40%.

(Evaluation)

The physical properties shown below were measured with respect to the polarizer, the retardation layer-attached polarizing plate, and the pressure-sensitive adhesive and retardation layer-attached polarizing plate obtained in each of Examples and Comparative Examples, and the pressure-sensitive adhesive and retardation layer-attached polarizing plate was evaluated as described below. The results are shown in Table 1.

(Presence or Absence of Red Discoloration After Heating)

The pressure-sensitive adhesive and retardation layer-attached polarizing plate (100 mm×100 mm) was allowed to stand under a circumstance at 100° C. for 500 hours, then visually observed in the crossed Nicol configuration and evaluated according to the criteria below.

○: The polarizing plate does not appear reddish.
x: The polarizing plate appears reddish.

(Hot Water Delamination)

The pressure-sensitive adhesive and retardation layer-attached polarizing plate (50 mm×25 mm) was immersed in hot water at 60° C., and 2 hours later, the state of the shrinkage of the polarizer at the edge of the film was visually observed and evaluated according to the criteria below.

○: A shrinkage of 2 mm or more from the edge is not observed.
x: A shrinkage of more than 2 mm from the edge is observed.

(Peripheral Unevenness)

While the pressure-sensitive adhesive layer was placed to face downward, the pressure-sensitive adhesive and retardation layer-attached polarizing plate was cut into a liquid crystal panel display unit size in such a manner that the absorption axis of the polarizer was set at 45°. The cut piece was mounted on both sides of a commercially available TN liquid crystal panel (19 inch size) in such a manner that the absorption axes of the polarizing plates were arranged orthogonal to each other. Thereafter, the panel was illuminated at 80° C. for 500 hours, and then unevenness in display was visually observed and evaluated according to the criteria below, when black was displayed.

○: Unevenness is not visible at the peripheral portion of the panel.
x: Unevenness is clearly visible at the peripheral portion of the panel.

(Thermal Shock)

The pressure-sensitive adhesive and retardation layer-attached polarizing plate (200 mm×300 mm) was attached to a glass plate and then subjected to 200 cycles of the environmental change: standing at −40° C. for 1 hour and standing at 80° C. for 1 hour. Thereafter, changes in appearance were visually observed and evaluated according to the criteria below.

○: No significant change in appearance is observed.
x: A change in appearance is clearly observed (such as peeling at the edge and foaming of the pressure-sensitive adhesive).

TABLE 1

| | Polarizer | | Dimensional Shrinkage (%) of Retardation layer-attached polarizing plate | Single-Piece Transmittance (%) of Pressure-sensitive adhesive and retardation layer-attached polarizing plate | Evaluation | | | Defects |
|---|---|---|---|---|---|---|---|---|
| | Single-Piece Transmittance (%) | Ratio (K/I) | | | Red Discoloration After Heating | Hot Water Delamination | Peripheral Unevenness | After Thermal Shock |
| Example 1 | 42.4 | 0.22 | 0.39 | 42.2 | ○ | ○ | ○ | ○ |
| Example 2 | 43.2 | 0.21 | 0.40 | 43.0 | ○ | ○ | ○ | ○ |
| Example 3 | 42.4 | 0.22 | 0.39 | 42.2 | ○ | ○ | ○ | X |
| Comparative Example 1 | 44.3 | 0.20 | 0.40 | 44.0 | X | ○ | ○ | ○ |
| Comparative Example 2 | 42.4 | 0.22 | 0.39 | 42.2 | ○ | X | ○ | ○ |

TABLE 1-continued

| | Polarizer | | Dimensional Shrinkage (%) of Retardation layer-attached polarizing plate | Single-Piece Transmittance (%) of Pressure-sensitive adhesive and retardation layer-attached polarizing plate | Evaluation | | | Defects |
|---|---|---|---|---|---|---|---|---|
| | Single-Piece Transmittance (%) | Ratio (K/I) | | | Red Discoloration After Heating | Hot Water Delamination | Peripheral Unevenness | After Thermal Shock |
| Comparative Example 3 | 42.4 | 0.22 | 0.60 | 42.3 | ○ | ○ | X | ○ |
| Comparative Example 4 | 42.2 | 0.24 | 0.40 | 42.0 | X | ○ | ○ | ○ |

Table 1 shows that the pressure-sensitive adhesive and retardation layer-attached polarizing plate of each Example suffers from no red discoloration after heating, no hot water delamination, or no peripheral unevenness and can resist changes in optical properties and keep visibility high, even under heated and humidified conditions. It is also shown that among Examples, Examples 1 and 2 in which the pressure-sensitive adhesive layer is formed with an acrylic pressure-sensitive adhesive using a peroxide and an isocyanate compound as crosslinking agents can satisfactorily achieve high durability so as to resist appearance defects even in the thermal shock test.

The invention claimed is:

1. A method for manufacturing a pressure-sensitive adhesive and retardation layer-attached polarizing plate (4), comprising:
   forming a retardation layer-attached polarizing plate (3) comprising:
   a polarizing plate (2) that comprises
   an iodine-based polarizer (1) and a transparent protective film laminated on both sides of the polarizer (1); and
   a retardation layer provided on at least one of the transparent protective films, and
   subjecting the retardation layer-attached polarizing plate (3) to heat treatment under a tension of 60 N/m to 450 N/m at a heating temperature of 60° C. to 120° C.; and
   then laminating an acrylic pressure-sensitive adhesive layer on the retardation layer side of the heat-treated retardation layer-attached polarizing plate (3),
   wherein the iodine-based polarizer (1) has a ratio (K/I), which is the content (% by weight) of potassium (K) to the content (% by weight) of iodine (1) in the polarizer, of 0.200 to 0.235,
   the polarizing plate (2) comprises the iodine-based polarizer (1) and the transparent protective film laminated with an adhesive layer formed from a water-soluble adhesive containing an acetoacetyl group-containing polyvinyl alcohol resin and a crosslinking agent,
   the retardation layer-attached polarizing plate (3) has a measured dimensional shrinkage of 0.5% or less in the direction of its absorption axis after it is allowed to stand at 80° C. for 24 hours, where the dimensional shrinkage is defined by the formula: dimensional shrinkage (%)= [{(dimension before standing)−(dimension after standing)}/(dimension before standing)]×100,
   the pressure-sensitive adhesive and retardation layer-attached polarizing plate (4) has a single-piece transmittance of 41.0% to 43.2% and,
   the acrylic pressure-sensitive adhesive layer is formed by a crosslinking reaction of an acrylic pressure-sensitive adhesive comprising a (meth)acrylic polymer (A) and a crosslinking agent, wherein the (meth)acrylic polymer (A) comprises 100 parts by weight of alkyl (meth)acrylate (a1) and 0.01 to 5 parts by weight of a hydroxyl group-containing (meth)acrylic monomer (a2) as copolymerizable components, and the acrylic pressure-sensitive adhesive comprises 0.02 to 2 parts by weight of a peroxide (B) as the crosslinking agent, and 0.001 to 2 parts by weight of an isocyanate compound (C) as the crosslinking agent relative to 100 parts by weight of the (meth)acrylic polymer (A).

2. The method for manufacturing the pressure-sensitive adhesive and retardation layer-attached polarizing plate (4) according to claim 1, wherein the retardation layer of the retardation layer-attached polarizing plate (3) is formed by coating a liquid crystal material on the transparent protective film, or formed by separately forming a coating of a liquid crystal material and transferring the coating to the transparent protective film, and the transparent protective film is integrated with the retardation layer.

3. The method for manufacturing the pressure-sensitive adhesive and retardation layer-attached polarizing plate (4) according to claim 1, wherein the retardation layer is formed by fixing a tilt-oriented discotic liquid crystal layer.

4. The method for manufacturing the pressure-sensitive adhesive and retardation layer-attached polarizing plate (4) according to claim 1 wherein the hydroxyl group-containing (meth)acrylic monomer (a2) has a hydroxyalkyl and the hydroxyalkyl has 4 or more carbon atoms.

5. The method for manufacturing the pressure-sensitive adhesive and retardation layer-attached polarizing plate (4) according to claim 1, wherein the hydroxyl group-containing (meth)acrylic monomer (a2) comprises 4-hydroxybutyl (meth)acrylate.

6. The method for manufacturing the pressure-sensitive adhesive and retardation layer-attached polarizing plate (4) according to claim 1, wherein the acrylic pressure-sensitive adhesive further comprises a silane coupling agent.

7. The method for manufacturing the pressure-sensitive adhesive and retardation layer-attached polarizing plate (4) according to claim 6, an amount of the silane coupling agent is in the range of from 0.01 to 1 part by weight relative to 100 parts by weight of the (meth)acrylic polymer (A).

8. The method for manufacturing the pressure-sensitive adhesive and retardation layer-attached polarizing plate (4) according to claim 1, wherein the acrylic pressure-sensitive adhesive layer is laminated on the retardation layer with an anchor coat layer interposed therebetween.

* * * * *